US011030095B2

United States Patent
Sakharshete et al.

(10) Patent No.: US 11,030,095 B2
(45) Date of Patent: Jun. 8, 2021

(54) VIRTUAL SPACE MEMORY BANDWIDTH REDUCTION

(71) Applicant: ADVANCED MICRO DEVICES, INC., Santa Clara, CA (US)

(72) Inventors: Swapnil Sakharshete, San Diego, CA (US); Samuel Lawrence Wasmundt, San Diego, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/215,298

(22) Filed: Dec. 10, 2018

(65) Prior Publication Data

US 2020/0183833 A1 Jun. 11, 2020

(51) Int. Cl.
*G06F 12/06* (2006.01)
*G06F 12/109* (2016.01)
*G06T 1/20* (2006.01)
*G06F 17/16* (2006.01)

(52) U.S. Cl.
CPC ........ *G06F 12/0646* (2013.01); *G06F 12/109* (2013.01); *G06F 17/16* (2013.01); *G06T 1/20* (2013.01); *G06F 2212/1041* (2013.01)

(58) Field of Classification Search
None
See application file for complete search history.

(56) References Cited

U.S. PATENT DOCUMENTS

| 2006/0265445 A1* | 11/2006 | Gustavson | G06F 17/16 708/520 |
| 2015/0324707 A1* | 11/2015 | Zhou | G06F 11/3409 717/124 |
| 2016/0062947 A1* | 3/2016 | Chetlur | G06F 17/153 708/420 |
| 2016/0117255 A1* | 4/2016 | Marshall | G06F 12/0804 711/3 |
| 2016/0239706 A1* | 8/2016 | Dijkman | G06K 9/00503 |
| 2019/0190538 A1* | 6/2019 | Park | G06N 3/063 |
| 2019/0325297 A1* | 10/2019 | Fowers | G06N 3/063 |
| 2019/0340502 A1* | 11/2019 | Park | G06N 3/0454 |

OTHER PUBLICATIONS

Chaos, "Implement Convolution in CNN", Sep. 9, 2016; <<http://xuhan.me/2016/09/09/conv/>>, accessed on Mar. 5, 2019, 5 pages.

* cited by examiner

*Primary Examiner* — Elias Mamo

(57) ABSTRACT

A processing system includes a central processing unit (CPU) and a graphics processing unit (GPU) that has a plurality of compute units. The GPU receives an image from the CPU and determines a total result area in a virtual-matrix-multiplication space of a virtual matrix-multiplication output matrix based on convolutional parameters associated with the image in an image space. The GPU partitions the total result area of the virtual matrix-multiplication output matrix into a plurality of virtual segments. The GPU allocates convolution operations to the plurality of compute units based on each virtual segment of the plurality of virtual segments.

18 Claims, 4 Drawing Sheets

VIRTUAL SPACE MEMORY BANDWIDTH REDUCTION

BACKGROUND

Machine learning algorithms are utilized in neural networks to perform tasks such as, for example, image recognition, natural language processing, and game play. Neural network architectures include a stack of layers that implement functions to transform an input volume (such as a digital image) into an output volume (such as labeled features detected in the digital image). For example, the layers in a neural network can be separated into convolutional layers, pooling layers, and fully connected layers. Multiple sets of convolutional, pooling, and fully connected layers can be interleaved to form a complete neural network.

Convolution is frequently performed by machine learning algorithms in which the convolution of image data with a filter is converted to a matrix multiplication format using operations such as im2col. However, the resulting image matrices are much larger than the original image data. For example, when image data is convolved with a three by three filter matrix, duplication of the original image data results in an image matrix that is nine times larger than the original image data. The increased amount of data leads to an increase in memory bandwidth consumption due to memory access requests by compute units that are performing the convolution operations. Thus, an improved method for reducing memory bandwidth for machine learning operations is desired.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate example systems and methods of implementing virtual general matrix-matrix multiplication (GEMM) space memory bandwidth reduction. In particular, virtual matrices located in a virtual GEMM space are used in combination with input images located in an image space to assign convolution operations to various compute units to maximize bandwidth efficiency. In addition, duplicative data associated with the convolutional operations are fetched from an internal cache hierarchy that prevents duplicative requests to global memory from occurring. In particular, a processing system includes a central processing unit (CPU) and a graphics processing unit (GPU) that has a plurality of compute units. The GPU receives an image from the CPU and determines a total result area in a virtual GEMM space of a virtual GEMM output matrix based on convolutional parameters associated with the image in an image space. The GPU partitions the total result area of the virtual GEMM output matrix into a plurality of virtual segments. The GPU allocates convolution operations to the plurality of compute units based on each virtual segment of the plurality of virtual segments.

Figure 1:
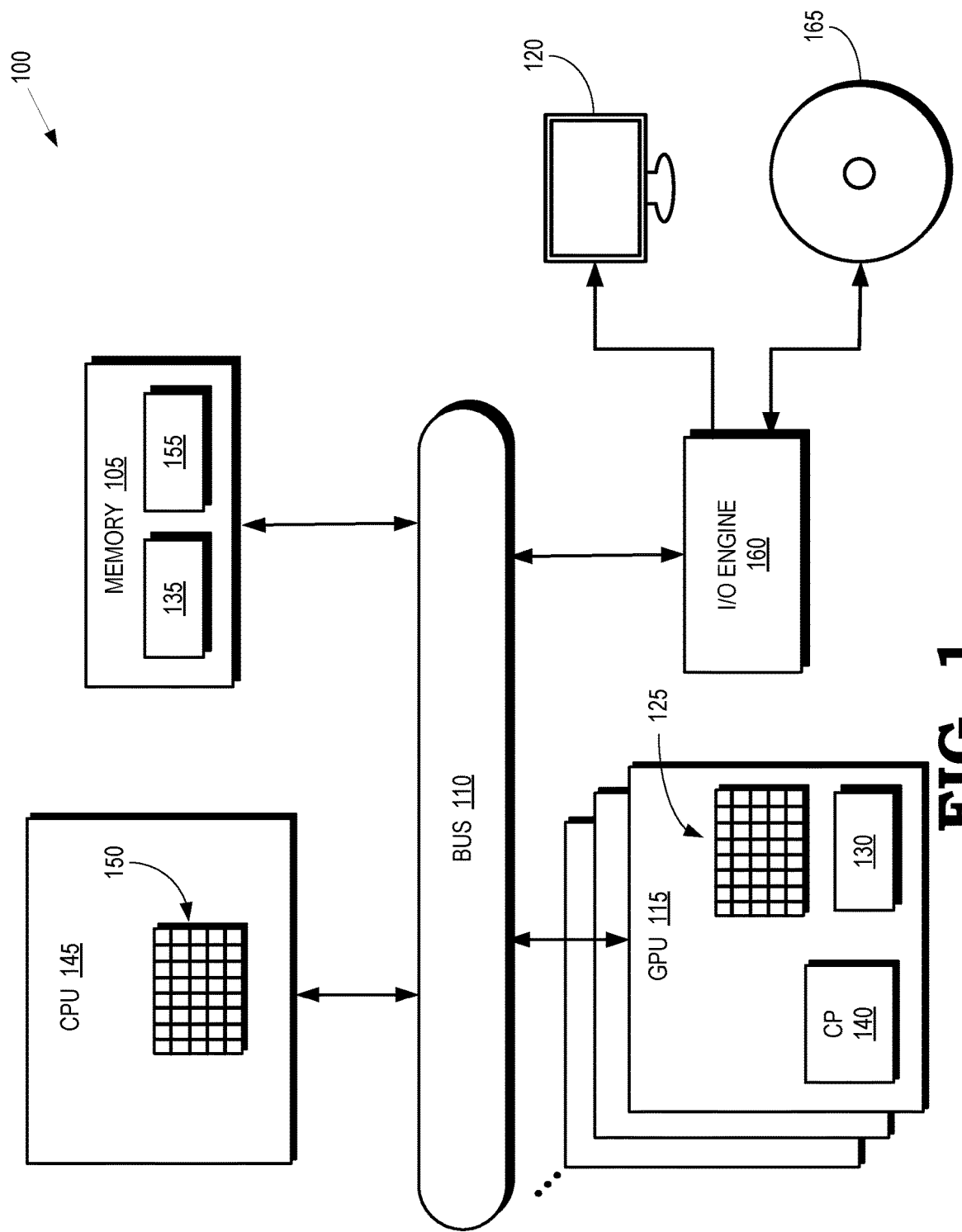
FIG. 1 is a block diagram of a processing system implementing virtual GEMM space memory bandwidth reduction in accordance with some embodiments.

FIG. 1 is a block diagram of a processing system 100 implementing virtual GEMM space memory bandwidth reduction in accordance with some embodiments. Processing system 100 includes a central processing unit (CPU) 145, a memory 105, a bus 110, graphics processing units (GPU/s) 115, an input/output engine 160, a display 120, and an external storage component 165. GPU 115 includes a command processor 140, compute units 125, and internal (or on-chip) memory 130. CPU 145 includes processor cores 150. Memory 105 includes a copy of instructions 135 and program code 155. In various embodiments, CPU 145 is coupled to GPUs 115, memory 105, and I/O engine 160 via bus 110.

Processing system 100 has access to memory 105 or other storage component that is implemented using a non-transitory computer readable medium such as a dynamic random access memory (DRAM). However, memory 105 can also be implemented using other types of memory including static random access memory (SRAM), nonvolatile RAM, and the like.

Processing system 100 also includes bus 110 to support communication between entities implemented in processing system 100, such as memory 105. Some embodiments of processing system 100 include other buses, bridges, switches, routers, and the like, which are not shown in FIG. 1 in the interest of clarity.

Processing system 100 includes one or more GPUs 115 that are configured to perform machine learning tasks and render images for presentation on display 120. For example, GPU 115 can render objects to produce values of pixels that are provided to display 120, which uses the pixel values to display an image that represents the rendered objects. Some embodiments of GPU 115 can also be used for general purpose computing. For example, GPU 115 can be used to implement machine learning algorithms for various types of neural networks, such as, for example, convolutional neural networks (CNNs) or recurrent neural networks (RNNs). In some cases, operation of multiple GPUs 115 are coordinated to execute the machine learning algorithms when, for example, a single GPU 115 does not possess enough processing power to execute the assigned machine learning algorithms. The multiple GPUs 115 communicate using inter-GPU communication over one or more interfaces (not shown in FIG. 1 in the interest of clarity).

Processing system 100 includes input/output (I/O) engine 160 that handles input or output operations associated with display 120, as well as other elements of processing system 100 such as keyboards, mice, printers, external disks, and the like. I/O engine 160 is coupled to the bus 110 so that I/O engine 160 communicates with memory 105, GPU 115, or CPU 145. In the illustrated embodiment, I/O engine 160 is configured to read information stored on an external storage component 165, which is implemented using a non-transitory computer readable medium such as a compact disk (CD), a digital video disc (DVD), and the like. I/O engine 160 can also write information to the external storage component 165, such as the results of processing by GPU 115 or CPU 145.

Processing system 100 also includes CPU 145 that is connected to bus 110 and communicates with GPU 115 and memory 105 via bus 110. In the illustrated embodiment, CPU 145 implements multiple processing elements (also referred to as processor cores) 150 that are configured to execute instructions concurrently or in parallel. CPU 145 can execute instructions such as program code 155 stored in memory 105 and CPU 145 can store information in memory 105 such as the results of the executed instructions. CPU 145 is also able to initiate graphics processing by issuing draw calls, i.e., commands or instructions, to GPU 115.

GPU 115 implements multiple processing elements (also referred to as compute units) 125 that are configured to execute instructions concurrently or in parallel. GPU 115 also includes internal memory 130 that includes a local data store (LDS), as well as caches, registers, or buffers utilized by the compute units 125. Internal memory 130 stores data structures that describe tasks executing on one or more of the compute units 125.

In the illustrated embodiment, GPU 115 communicates with memory 105 over the bus 110. However, some embodiments of GPU 115 communicate with memory 105 over a direct connection or via other buses, bridges, switches, routers, and the like. GPU 115 can execute instructions stored in memory 105 and GPU 115 can store information in memory 105 such as the results of the executed instructions. For example, memory 105 can store a copy of instructions 135 from program code that is to be executed by GPU 115, such as program code that represents a machine learning algorithm or neural network. GPU 115 also includes coprocessor 140 that receives task requests and dispatches tasks to one or more of the compute units 125.

During operation of processing system 100, CPU 145 issues commands or instructions to GPU 115 to initiate processing of a kernel that represents the program instructions that are executed by GPU 115. Multiple instances of the kernel, referred to herein as threads or work items, are executed concurrently or in parallel using subsets of compute units 125. In some embodiments, the threads execute according to single-instruction-multiple-data (SIMD) protocols so that each thread executes the same instruction on different data. The threads are collected into workgroups that are executed on different compute units 125.

In various embodiments, CPU 145 provides an image to GPU 115. GPU 115 receives the image and stores the image in global memory of internal memory 130. Coprocessor 140 of GPU 115 evaluates the image in the image space for use in a virtual GEMM space. The image space is the space where the received image remains pixelated as an image and is distinct from the virtual GEMM space. The virtual GEMM space is a virtual space that includes virtual matrices whose dimensions are used to efficiently allocate convolution operations to compute units 125, as well as reduce the number of memory access requests to global memory. In various embodiments, a matrix-multiplication space may be considered a virtual GEMM space.

GPU 115 generates the virtual matrices in the virtual GEMM space which include, for example, a virtual GEMM space matrix, a GEMM space filter matrix, and a virtual GEMM space output matrix. Virtual GEMM space matrix, GEMM space filter matrix, and virtual GEMM space output matrix are partitioned into virtual subsets or virtual segments. In various embodiments, partitioning the set of virtual matrices into virtual segments allows the convolution operation that is used extensively in machine learning algorithms to be divided into smaller operations. The pixelated data associated with the subsets or segments of the virtual matrices are matrix multiplied with the corresponding subsets of virtual filter matrices, instead of the entire matrix being multiplied by the entire filter matrix. Based on the partitioned virtual segments, coprocessor 140 allocates the convolution operations to compute units 125 whose associated caches, such as, for example, L1 caches, of internal memory 130 are used to cache the duplicative data that is retrieved from memory.

In order to reduce the number of memory access requests, the contents of the image matrices in virtual GEMM matrix space are mapped to the image data in image space using, for example, a mapping function or set of mapping functions. The mapping function or mapping operation allows for the mapping of pixels from the image space to the virtual GEMM matrix space (or vice-versa) that is a one-to-many mapping because each pixel in image space is duplicated multiple times to generate the matrices that are used to perform convolution by matrix multiplication. In some embodiments, because of the mapping function, compute units 125 make multiple memory access requests to retrieve values of each pixel from the memory only during the initial request. The subsequent requests to retrieve the value of the same pixel are served by, for example, the L1 cache associated with each compute unit of compute units 125. Thus, the compute unit of compute units 125 retrieves image data for duplicated pixels from its corresponding L1 cache instead of the global memory, which reduces memory access latency and the memory bandwidth for processing system 100.

In various embodiments, for example, a pixel value from the memory is stored in the L1 cache associated with a compute unit of compute units 125 the first time the compute unit retrieves the pixel value from memory. During the initial memory access, the memory access consumes the typical amount of memory bandwidth associated with accessing the pixel value. However, the pixel value is retrieved from the L1 cache each subsequent time the compute unit retrieves the pixel value to populate a duplicate pixel. The subsequent accesses do not consume memory bandwidth associated with the first memory access. Thus, the memory bandwidth consumed by the machine learning algorithms being implemented in processing system 100 is reduced, which allows the machine learning algorithm to benefit from hardware acceleration of matrix multiplications by acquiring image data on-the-fly to populate virtual GEMM space matrices that are used to perform convolution by matrix multiplication with a corresponding GEMM space filter matrix.

Figure 2:
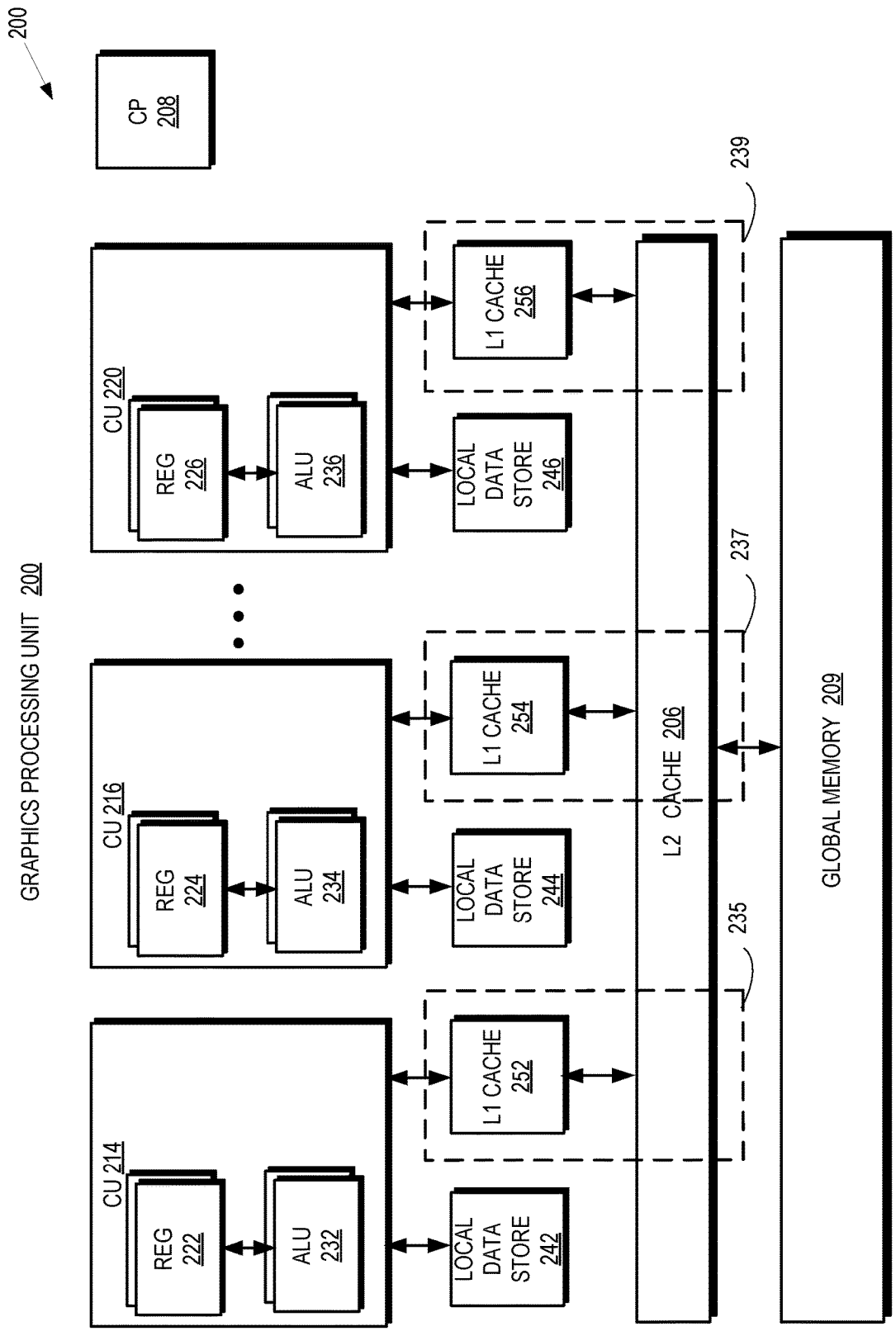
FIG. 2 is a block diagram of a GPU implementing virtual GEMM space memory bandwidth reduction in accordance with some embodiments.

FIG. 2 is a block diagram of a graphics processing unit (GPU) 200 implementing virtual GEMM space memory bandwidth reduction in accordance with some embodiments. GPU 200 includes a compute unit 214, a compute unit 216, a compute unit 220, a local data store 242, a local data store 244, a local data store 246, an L1 cache 252, an L1 cache 254, an L1 cache 256, an L2 cache 206, a global memory 209, an internal cache hierarchy 235, an internal cache hierarchy 237, an internal cache hierarchy 239, and a command processor 208. Compute unit 214 includes an arithmetic logic unit (ALU) 214 and register files 222. Compute unit 216 includes an arithmetic logic unit (ALU) 234 and register files 224. Compute unit 220 includes an arithmetic logic unit (ALU) 236 and register files 226. In various embodiments, compute unit 214 is coupled to (or associated with) local data store 242 and cache 252. Compute unit 216 is coupled to (or associated with) local data store 244 and cache 254. Compute unit 220 is coupled to (or associated with) local data store 246 and cache 256.

The plurality of compute units 214, 216, 220 (collectively referred to herein as "compute units 214-220") are used to execute threads of a workgroup concurrently or in parallel. For example, compute units 214-220 can execute instructions in the same kernel using different input data to generate different output results. Compute units 214-220 are each associated with register files 222, 224, 226 (collectively referred to herein as "register files 222-226"). Register tiles 222-226 are arrays of processor registers in GPU 200 that are used to store information that define a context of the corresponding compute units 214-220 while executing instructions in a thread. Values are stored in the register files 222-226 in response to threads being scheduled for execution on the compute units 214-220. The values can be modified by the compute units 214-220 to reflect the changing context of the compute units 214-220 in response to execution of instructions on compute units 214-220. The values stored in register files 222-226 are copied to an external memory (such as the memory 105 shown in FIG. 1). The values are then erased from the register files 222-226 (or written over by new context information for a different instruction or workgroup) in response to preemption of instructions or workgroups executing in the GPU 200.

Compute units 214-220 include ALU 232, ALU 234, and ALU 236 (collectively referred to herein as "arithmetic logic units 232-236"). Arithmetic logic units 232-236 are optimized to accelerate matrix multiplication for machine learning algorithms and neural networks. For example, in one embodiment, arithmetic logic units 232-236 are hardware blocks that are configured to accelerate 16×16×16 block matrix multiplication. In various embodiments, deep learning operations performed by processing system 100 utilize machine learning algorithms that are converted to matrix multiplication form to take advantage of the hardware acceleration provided by arithmetic logic units 232-236.

Local data store 242, local data store 244, and local data store 246 (collectively referred to herein as "local data stores 242-246") are used to store data that is generated by or used by compute units 214-220. Some embodiments of local data stores 242-246 are partitioned to provide separate regions for each of compute units 214-220. Local data stores 242-246 are also used to facilitate exchange or sharing of data between compute units 214-220. Data associated with threads of a workgroup are stored in local data stores 242-246 in response to threads being scheduled for execution on compute units 214-220.

GPU 200 also implements internal cache hierarchy 235, internal cache hierarchy 237, and internal cache hierarchy 239 (collectively referred to herein as "internal cache hierarchy 235-239"), that includes one or more levels of cache, e.g., L1 cache and L2 cache, that are used to cache instructions or data for duplicative data or data of relatively low latency access by compute units 214-220. Internal cache hierarchy 235 includes a number of individual caches and corresponding cache locations. GPU 200 includes a cache controller (not shown) for controlling movement of data between levels of internal cache hierarchy 235, as well as movement of data between internal cache hierarchy 235, global memory 209, and memory 105, as described further below.

During operation of GPU 200, GPU 200 receives an input image in the form of batches and corresponding filters from, for example, CPU 145. GPU 200 stores the image data and filter data in global memory 209. In various embodiments, the input image data provided from CPU 145 is in either in NCHW format or NHWC format, where N represents the number of images in a batch, H refers to the number of pixels in the vertical (height) dimension, W represents the number of pixels in the horizontal (width) dimension, and C refers to the channels. When GPU 200 receives the input image and the image is not in NHWC format (e.g., the image is in NCHW format), command processor 208 of GPU 200 converts the image into NHWC format for use by GPU 200. In various embodiments, the image in NCHW format includes a padding parameter that is also converted to NHWC format.

In various embodiments, in order to facilitate memory bandwidth reduction, command processor 208 ascertains the convolutional parameters that are convolution characteristics associated with the input image. Command processor 208 uses the convolutional parameters to determine a total result area of a virtual GEMM space output matrix. In various embodiments, the convolutional characteristics for the input image within the batch N include, for example, as stated previously, input image height, width, channel depth, filter height, width, stride in width, stride in height. Command processor 208 determines the total result area by ascertaining K (the number of output filters) and N (the batch size) from the convolutional parameters, and by computing the parameters P and Q, which are the convolved output images height and width, respectively. Based on the parameters P and Q and the convolutional parameters N and K, command processor 208 is able to ascertain NPQ×K, which is the total result area of the virtual GEMM space output matrix.

In various embodiments, P and Q are calculated for each kernel set which ranges over K. For example, the height P and width Q are calculated from the convolutional parameters which include the input image height H, input image width W, input channel depth C, input image padding along height Ph, input image padding along width Pw, filter height R, filter width S, filter stride along width U and filter stride along height V as P=floor((H−R+2*Ph)/v)+1 and Q=floor ((W−S+2*Pw)/u)+1. Using the values of P and Q, command processor 208 then computes the total result area in the virtual GEMM space using dimensions NPQ×K.

Command processor 208 ascertains the value of the total result area and partitions the total result area into a plurality of virtual segments. In various embodiments, the dimensions of the virtual segments depend upon the total number of compute units and the total result area. That is, the dimensions of the virtual segments are calculated by taking the square root of the total result area of virtual GEMM output matrix divided by the number of compute units 214-216 of GPU unit 200. The total result area of virtual GEMM output matrix is computed by multiplying the first dimension of virtual GEMM output matrix (i.e., NPQ) times the second dimension of virtual GEMM output matrix (i.e., K). For example, assume the number of compute units available to GPU 200 is 64. When NPQ equals 128 and K equals 128, the total result area of virtual GEMM output matrix is 16,384. The total result area of virtual GEMM output matrix, 16,384, divided by the number of available compute units, 64, is 256. The square root of 256 is 16, which are the dimensions of the virtual segment. That is, the dimensions (a×b) of the virtual segment are 16×16. Based on the partitioning of the total result area, command processor 205 is able to divide the convolution operation into smaller operations in which a subset of the virtual GEMM space matrix is matrix multiplied with a corresponding subset of the GEMM space filter matrix.

In various embodiments, the dimensions of the virtual segments are calculated by taking the estimated square root of the total result area, i.e., a "squarish" total result area where the total result area is not an exact square, of virtual GEMM output matrix divided by the number of compute units 214-216 of GPU unit 200. That is, when there is not an exact square root of the total result area of virtual GEMM output matrix divided by the number of compute units 214-216, GPU 200 selects square multiplicative factors that closely approximate to the total result area of virtual GEMM output matrix divided by the number of compute units. An estimate is made by GPU 200 of multiples whose values closely square to the total result area of virtual GEMM output matrix divided by the number of compute units.

Command processor 208 provides the virtual segment dimensions to the kernel executing or running on, for example, compute units CU 214-220. Command processor 208 uses the virtual segment dimensions to attain the dimensions (a×RSC) of a virtual GEMM space matrix segment and the dimensions (RSC×b) of GEMM space filter matrix segment. Once the dimensions of virtual GEMM space matrix segment and GEMM space filter matrix segment are known, command processor 208 uses the virtual 2-D points (x, y) of each virtual GEMM space matrix segment (a×RSC) in the virtual GEMM space matrix and maps each point from the virtual GEMM space matrix to a pixel (n, h, w, c) in the original input image in the image space in global memory 209.

In various embodiments, as the input image located in the image space has remained in (n, h, w, c) format, mappings are created from the (x, y) position of the virtual GEMM space matrix segment to the (n, c, h, w) position of the image in the image space. Thus, command processor 208 only requests specific memory values that are needed to make up the virtual GEMM space matrix segment and the GEMM space filter matrix segment that are currently being utilized. In various embodiments, the mappings or mapping functions used to map (x, y) from the virtual GEMM space to (n, c, h, w) in the image space are, for example:

int $n=y/(P*Q)$;

int $c=x\% \; C$;

int $h=((y \; \% \; (P*Q))/Q)*v+x/(S*C)$;

int $w=(((y \; \% \; Q)*u*C)+(x\% \; (S*C)))/C$;

After mapping the (x, y) position of the virtual GEMM space matrix segment to the (n, c, h, w) position of the image in the image space, command processor 208 fetches data associated with virtual GEMM space matrix segment by linearizing the pixel coordinate (n, h, w, c) to create an address into the input image memory. Duplicate data in the virtual GEMM space maps to the same addresses causing data to be fetched from the internal cache hierarchy, e.g., L1 cache 252 and L2 cache 206. Command processor 208 fetches data associated with GEMM space filter matrix segment from memory for matrix multiplication.

During the convolutional process, compute units 214-220 make multiple memory fetch requests to retrieve values of each pixel from global memory 209. However, only the initial request to retrieve the value of a pixel is served by global memory 209, the subsequent requests to retrieve the value of the same pixel are served by, for example, each L1 cache and L2 cache associated with compute units 214-220. Thus, for example, compute unit 250 retrieves image data for duplicated pixels from its corresponding associated L1 cache 250 instead of global memory 209.

Once the data has been fetched corresponding to the virtual GEMM space matrix segment and the GEMM space filter matrix, the data fetched for virtual GEMM space matrix segment is matrix multiplied with data fetched for GEMM space filter matrix segment in the corresponding compute unit to generate the convolution result in an output matrix. The final result is a combination of the matrix multiplication results of each compute unit and is the convolution output provided to the final output matrix. The convolution output is then transformed from NPQ×K to (N, K, P, Q) for use by, for example, GPU 200.

Figure 3:
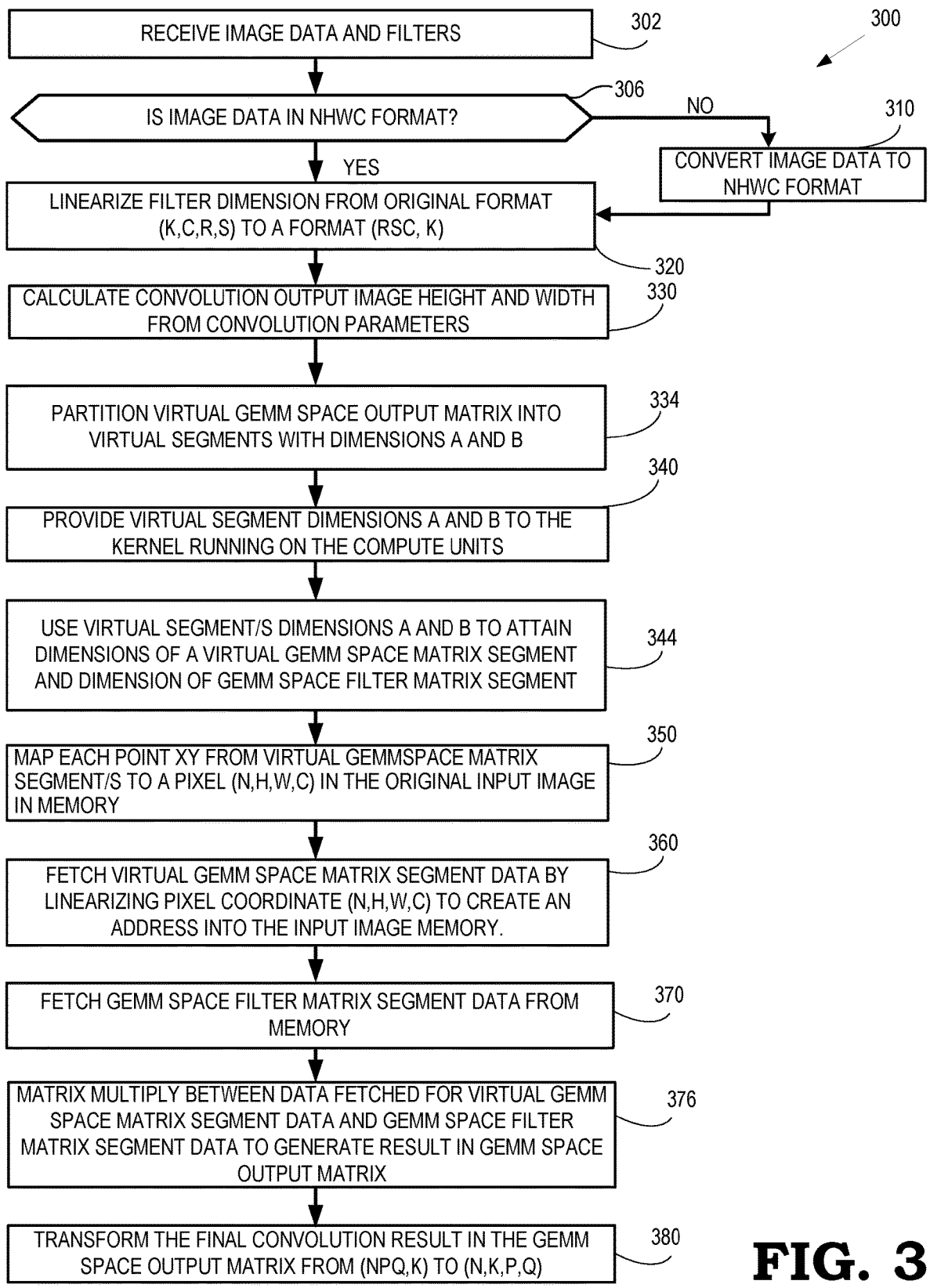
FIG. 3 is a flow diagram illustrating a method for performing virtual GEMM space memory bandwidth reduction in accordance with some embodiments.

FIG. 3 is a flow diagram illustrating a method for performing virtual GEMM space memory bandwidth reduction in accordance with some embodiments. The method 300 is implemented in some embodiments of processing system 100 shown in FIG. 1 and GPU 200 shown in FIG. 2.

In various embodiments, the method flow begins with block 302. At block 302, GPU 200 receives image data in the form of batches and filters from, for example, CPU 145. At block 306, a determination is made by GPU 200 as to whether the image data is in NHWC format, where N is the batch size, C is the number of input channels, H is the height of the input image, and W is the width of the input image. When the image data is not in NHWC format, such as, for example, NCHW format, the image data is converted to NHWC format in block 310.

When the image data is in NHWC format, at block 320, the dimension of an image space filter is linearized using the filter dimensions of the original format (e.g., a 4-D filter dimension) KCRS to GEMM space filter matrix form with a dimension of RSC×K. In various embodiments, the image space filter is linearized by, for example, concatenating the dimensions of R, S, and C.

At block 330, the height P and width Q of the convolution output image are calculated. In various embodiments, the height P and width Q are calculated from convolutional parameters that allow for the determination of matrix multiplication virtual result output for virtual GEMM space output matrix with dimensions NPQ×K.

At block 334, the total result area of virtual GEMM output matrix is partitioned into virtual segments with dimensions a×b, where a is the height of the virtual segment and b is the width of the virtual segment. In various embodiments, to compute the total result area of virtual GEMM output matrix, the dimensions of virtual GEMM space output matrix are multiplied together to yield the total result area, i.e., NPQ multiplied by K gives the total result area NPQ×K. In various embodiments, a and b are calculated by taking the square root of the total result area of virtual GEMM output matrix divided by the number of compute units of GPU unit 200. The total result area of virtual GEMM output matrix is computed by multiplying a first dimension of virtual GEMM output matrix (i.e., NPQ) times a second dimension of virtual GEMM output matrix (i.e., K).

At block 340, virtual segment dimensions a×b are provided to the kernel executing or running on, for example, compute units CU 214-220. At block 344, the virtual segment dimensions a and b of virtual GEMM space output matrix are used to attain dimensions a×RSC of virtual GEMM space matrix and the dimensions RSC×b of GEMM space filter matrix.

At block 350, once the dimensions of virtual GEMM space matrix and virtual filter matrix are known, the 2-D points (x, y) of each virtual segment a×RSC in virtual GEMM space matrix are mapped from the virtual GEMM space matrix to a pixel (n, h, w, c) in the original input image in the image space in memory.

At block 360, virtual GEMM space matrix data is fetched by linearizing pixel coordinate (n, h, w, c) to create an address into the input image memory 205. Duplicate data in virtual GEMM space is mapped to the same addresses causing data to be fetched from internal cache hierarchy, such as, for example, L1 cache 252 and L2 cache 252. At block 370, GEMM space filter matrix data is fetched from the memory.

At block 376, data fetched for virtual GEMM space matrix segment is matrix multiplied with data fetched for GEMM space filter matrix segment to generate the convolution result in GEMM space output matrix. At block 380, the convolution result in the GEMM space output matrix is transformed from NPQ×K to (N, K, P, Q), i.e., image space form, for use by, for example, GPU 200.

Figure 4:
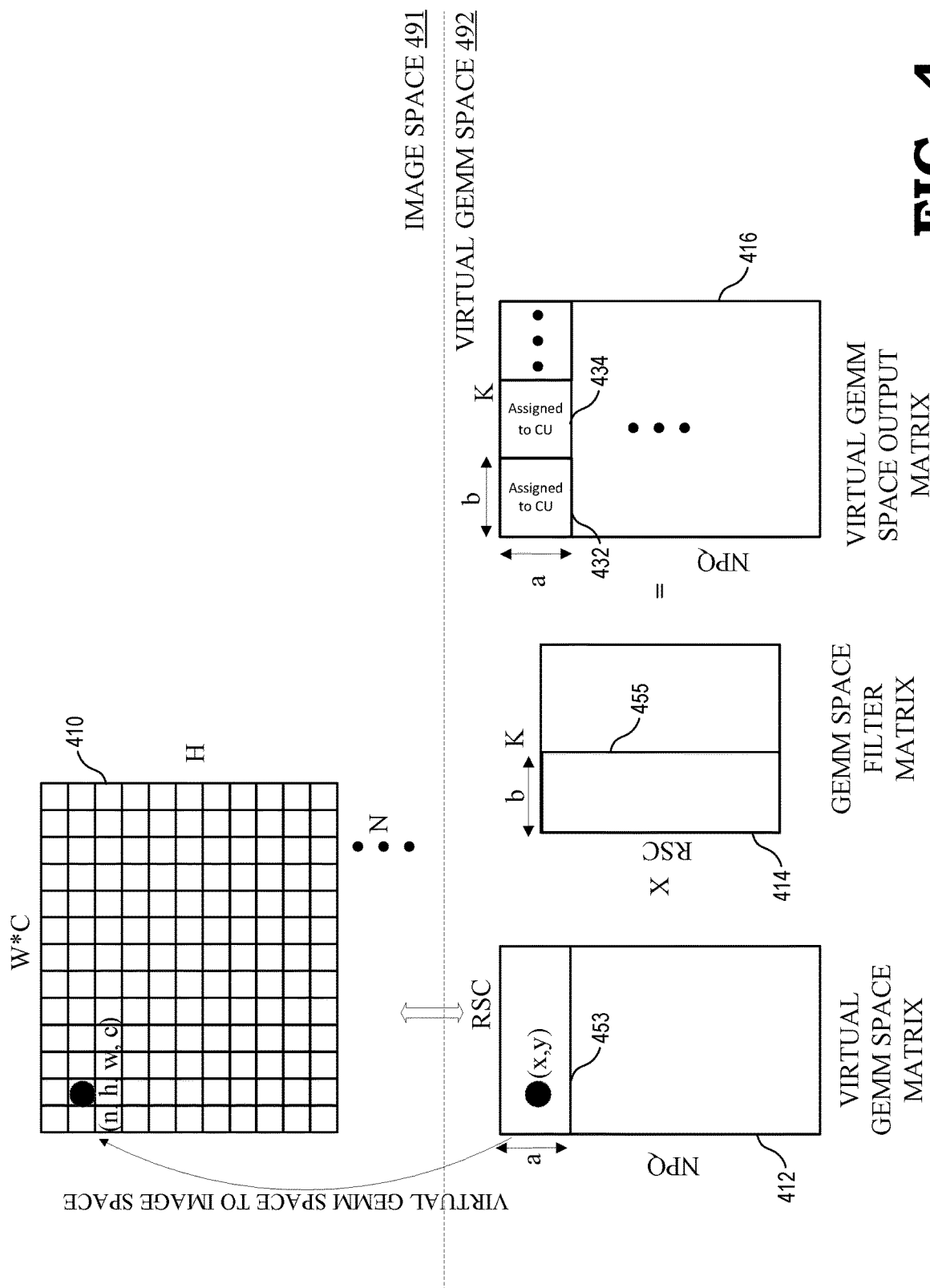
FIG. 4 is a virtual GEMM space implementation of memory bandwidth reduction in accordance with some embodiments.

FIG. 4 illustrates a virtual GEMM space implementation of memory bandwidth reduction in accordance with some embodiments. FIG. 4 includes an image space 491 and a virtual GEMM space 492. Image space 491 includes an image 410. Virtual GEMM space 492 includes a virtual GEMM space matrix 412, a GEMM space filter matrix 414, and a virtual GEMM space output matrix 416. Virtual GEMM space matrix 412 includes a virtual GEMM space segment 453. GEMM space filter matrix 414 includes a GEMM space filter matrix segment 455. Virtual GEMM space matrix 416 includes a virtual segment 432 and a virtual segment 434.

In various embodiments, with reference to FIGS. 1-3, image 410 is an input image that resides in image space 491 and serves as input image data in the form NHWC for GPU 200. As stated previously, N is the batch size, C is the number of input channels, H is the height of the input image, and W is the width of the input image. GPU 200 utilizes the image data from image space 491 to calculate values P and Q that are used to ascertain the dimensions NPQ×K of virtual GEMM space output matrix 416 in virtual GEMM space 492.

GEMM space filter matrix 414 is a GEMM space filter matrix with dimensions RSC×K whose dimensions are the result of a linearization from a KCRS filter (not shown) to the GEMM space filter matrix 414. In various embodiments, KCRS filter is converted into a (RCS, K) matrix by concatenating the dimensions R, C, and S. GEMM space filter matrix segment 455 is a virtual segment of GEMM space filter matrix 414 whose dimensions (RSC×b) are based on the dimensions of virtual GEMM space output matrix segment 432 and GEMM space filter matrix 414.

Virtual GEMM space matrix 412 is a virtual GEMM space matrix with dimensions NPQ by RSC. Virtual GEMM space matrix segment 453 is a virtual segment of virtual GEMM space matrix 412 whose dimensions (a×RSC) are based on the dimensions of virtual GEMM space output matrix segment 432 and GEMM space filter matrix 414.

Virtual GEMM space output matrix 416 is a virtual matrix that has dimensions NPQ×K. In various embodiments, as depicted, the dimensions NPQ and K and the number of compute units 214-220 available to GPU 200 are used to ascertain the partition dimensions of virtual segment 432 and virtual segment 434. Virtual GEMM space output matrix 416 is segmented or partitioned into virtual segment 432 and virtual segment 434 to be allocated for work flow by, for example, compute units 214-216. In various embodiments, the number of partitioned virtual segments in virtual GEMM space output matrix 416 may vary depending upon the number of compute units available in GPU 200. For example, in one embodiment, if there are 64 compute units available then virtual GEMM space output matrix will be partitioned into 64 virtual segments for work distribution. The use of image data in the image space and the virtual matrices in virtual GEMM space provides processing system 100 with the capability to reduce the number of access requests associated with duplicate data by accessing an internal cache hierarchy instead of global memory, while assigning convolution operations to compute units 214-220.

In some embodiments, the apparatus and techniques described above are implemented in a system including one or more integrated circuit (IC) devices (also referred to as integrated circuit packages or microchips), such as for the processing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
ascertaining convolutional parameters associated with an image in an image space;
determining, based on said convolutional parameters, a total result area in a virtual matrix-multiplication space of a virtual matrix-multiplication output matrix;
partitioning said total result area of said virtual matrix-multiplication output matrix into a plurality of virtual segments; and
allocating convolution operations to a plurality of compute units based on each virtual segment of said plurality of virtual segments.

2. The method of claim 1, further comprising:
generating a matrix-multiplication space filter matrix based on filter dimensions of an image space filter; and
generating a virtual matrix-multiplication space matrix based on said filter dimensions and said convolutional parameters.

3. The method of claim 2, further comprising:
generating a matrix-multiplication space filter matrix segment of said matrix-multiplication space filter matrix and a virtual matrix-multiplication space matrix segment of said virtual matrix-multiplication space matrix based on dimensions of each virtual segment of said plurality of virtual segments.

4. The method of claim 3, further comprising:
performing a first convolution operation of said convolution operations based on said matrix-multiplication space filter matrix segment and said virtual matrix-multiplication space matrix segment.

5. The method of claim 4, further comprising:
mapping each point XY of said virtual matrix-multiplication space matrix segment to a pixel in said image of said image space.

6. The method of claim 5, further comprising:
fetching virtual matrix-multiplication space matrix data from said image by linearizing a pixel coordinate of said pixel to create an address into a memory where said image is stored.

7. The method of claim 6, further comprising:
fetching matrix-multiplication space filter matrix data from said memory.

8. The method of claim 7, further comprising:
performing matrix multiplication between said virtual matrix-multiplication space matrix data and matrix-multiplication space filter matrix data to generate a convolution result for virtual matrix-multiplication output matrix.

9. The method of claim 8, further comprising:
transforming said convolutional result of said virtual matrix-multiplication output matrix to image space form.

10. The method of claim 1, further comprising:
determining whether there is duplicate data in convolutional data associated with said convolution operations by performing a mapping operation.

11. The method of claim 10, wherein:
said virtual matrix-multiplication space is a virtual GEMM space and said virtual matrix-multiplication output matrix is a virtual GEMM output matrix.

12. A processing system, comprising:
a processor configured to be coupleable to a memory, said processor having a plurality of compute units, wherein said processor is configured to receive an image from said memory, determine a total result area in a virtual matrix-multiplication space of a virtual matrix-multiplication output matrix based on convolutional parameters associated with said image in an image space, partition said total result area of said virtual matrix-multiplication output matrix into a plurality of virtual segments, and allocate convolution operations to a plurality of compute units based on each virtual segment of said plurality of virtual segments.

13. The processing system of claim 12, wherein said processor is configured to generate a virtual matrix-multiplication space virtual segment and a virtual matrix-multiplication space filter virtual segment based on dimensions of a virtual segment of said plurality of virtual segments.

14. The processing system of claim 13, wherein said processor is configured to perform a first convolution operation of said convolution operations based on said virtual matrix-multiplication space matrix segment and said matrix-multiplication space filter matrix segment.

15. The processing system of claim 12, wherein said processor is configured to determine whether there is duplicate data in convolutional data associated with said convolution operations.

16. The processing system of claim 12, further comprising:
an internal cache hierarchy and a global memory, wherein said processor is configured to place duplicate data in said internal cache hierarchy and accesses said duplicate data from said internal cache hierarchy instead of said global memory.

17. A method comprising:
receiving image data into a global memory of a processor;
placing said image data into an internal cache hierarchy of said processor;
determining which data associated with convolutional data of said image data is duplicate data; and accessing said duplicate data from said internal cache hierarchy based on said determination of whether said data is said duplicate data;

generating a virtual GEMM output matrix based on convolutional parameters associated with said image data; and partitioning a total result area of a virtual GEMM space output matrix into a plurality of virtual segments, wherein determining which data associated with said convolutional data is said duplicate data is based on an address assessment of duplicative memory requests by said processor.

18. The method of claim 17, allocating a convolution operation to a first compute unit of a plurality of compute units based on said convolutional parameters associated with said image data.

* * * * *